United States Patent [19]

Stähler

[11] 4,028,245
[45] June 7, 1977

[54] ARRANGEMENT FOR CONVERSION OF FOREIGN MATTER CONTAINED IN WATER

[75] Inventor: Theo Stähler, Hadamar-Niederzeuzheim, Germany

[73] Assignee: Rheintechnik Weiland & Kaspar KG, Neunkirchen (Saar), Germany

[22] Filed: Feb. 23, 1976

[21] Appl. No.: 660,229

[30] Foreign Application Priority Data

Oct. 3, 1975 Germany ........................... 2544177
Feb. 28, 1975 Germany ........................... 2508749

[52] U.S. Cl. .................... 210/151; 119/3; 210/167; 210/195 S
[51] Int. Cl.² .................... C02C 5/10; A01K 61/00
[58] Field of Search ............. 119/3, 5; 210/17, 150, 210/151, 167, 169, 195 S, 274, 293, 523, 525

[56] References Cited

UNITED STATES PATENTS

| | | | |
|---|---|---|---|
| 513,536 | 1/1894 | Scowden | 210/150 |
| 563,811 | 7/1896 | Scowden | 210/150 |
| 2,149,313 | 3/1939 | Sayers et al. | 210/525 |
| 2,593,036 | 4/1952 | Koch | 210/525 X |
| 2,961,099 | 11/1960 | Lind et al. | 210/525 X |
| 3,028,967 | 4/1962 | Dannenbaum | 210/151 X |
| 3,371,033 | 2/1968 | Simmons et al. | 210/150 X |
| 3,540,589 | 11/1970 | Boris | 210/150 |
| 3,717,251 | 2/1973 | Hampton | 210/274 X |
| 3,741,158 | 6/1973 | Moe, Jr. et al. | 119/3 |
| 3,847,811 | 11/1974 | Stengelin | 210/150 |

FOREIGN PATENTS OR APPLICATIONS

| | | | |
|---|---|---|---|
| 706,362 | 5/1941 | Germany | 210/151 |
| 1,275,967 | 8/1968 | Germany | 210/151 |

*Primary Examiner*—Thomas G. Wyse
*Assistant Examiner*—Robert H. Spitzer
*Attorney, Agent, or Firm*—Max Fogiel

[57] ABSTRACT

An arrangement for converting foreign and harmful matter found particularly in sewage water, in which the foreign matter is converted into harmless materials. A conversion tank with an intake for the water to be treated and having a drain for the treated water, is provided with rotating tubular members with perforations. These tubular members in the form of pipes, emerge on one side completely out of the water, whereas they are immersed on the otherside entirely into the water. The pipes are filled with materials which are insoluble in the water and which have a large surface area accessible to air and water. The pipes are carried by spoked wheels on a shaft, and they are paralel to each other as well as to the water surface. The perforations may be in the form of slots having parallel axes.

25 Claims, 9 Drawing Figures

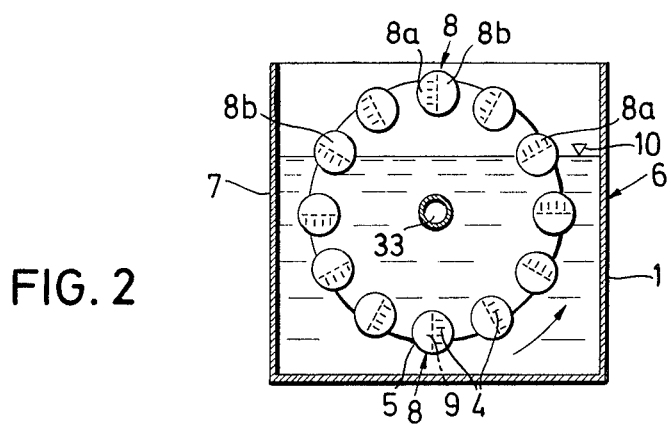
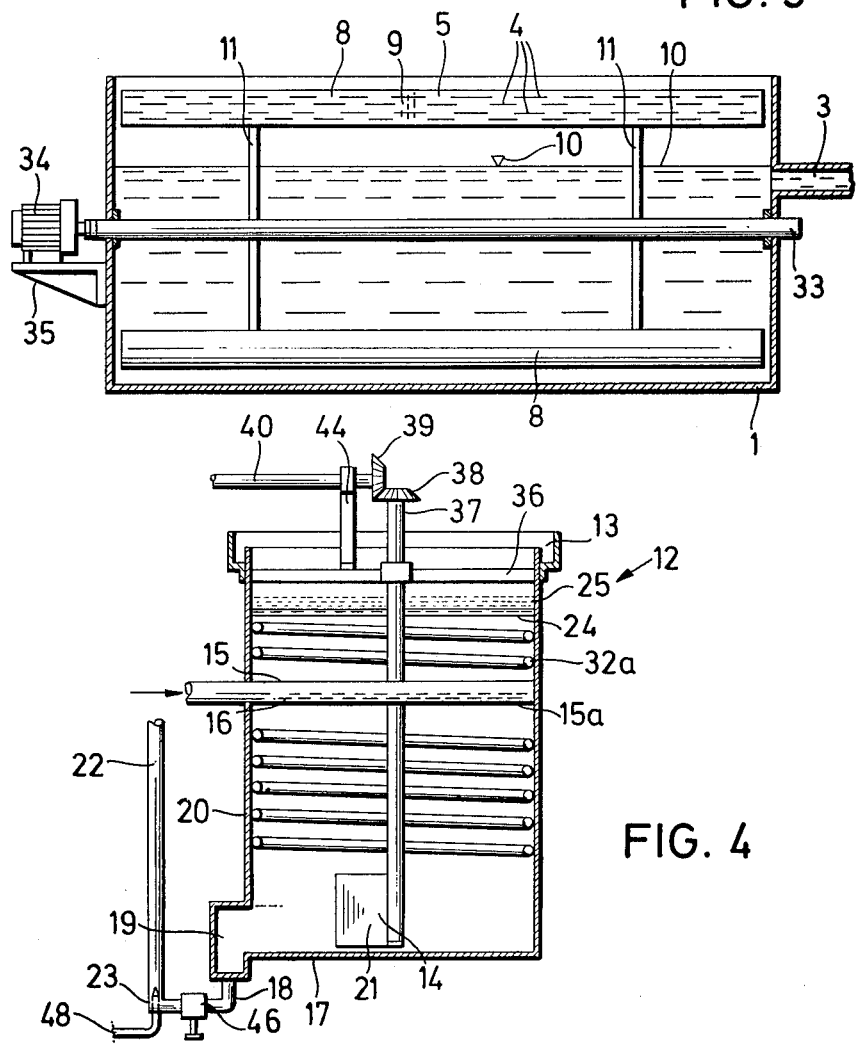

ARRANGEMENT FOR CONVERSION OF FOREIGN MATTER CONTAINED IN WATER

BACKGROUND OF THE INVENTION

The present invention relates to an arrangement for the conversion into harmless matter of foreign matter, particularly harmful matter such as fecal matter encountered in waters, particularly waste water.

It is already known in the art how to use for the clarification of waste water, rotating immersion bodies whose walls have many perforations and which are filled with material having a large surface area accessible to water and air. On the material with the large surface area accessible to water and air, there forms a biological breeding ground which converts harmful matter contained in the water, particularly fecal matter, into harmless matter so that the waste water can be discharged into rivers without major damage to the ecology. In the process, a certain aeration is achieved because during emergence of the bodies from the water, not all the water passes immediately through the perforations, and part of this water flows back through the perforations.

However, a clarification whereby the water after treatment with the immersion bodies and after filtration of the solid matter and, if necessary, after a minor chemical treatment can be used by consumers, e.g., as potable water, is not achieved in this manner.

It is, therefore, an object of the present invention to provide an arrangement for the conversion of foreign matter, particularly harmful matter such as fecal matter, found in waters, particularly waste water, into harmless matter. Immersion bodies are to be used with perforated walls. The bodies are to hold materials having a large surface area accessible to water and air. On these materials there is to be formed a biological breeding ground by means of which the foreign matter, particularly harmful matter contained in the water can be converted into harmless matter so that the water, after prior separation of floating matter, can be used again, e.g., as industrial water, as drinking water for cattle, as water for installations for the hatching, breeding and feeding of fish, and also as potable water.

If necessary, after converting the harmful matter before or particularly after separating the floating matter, a chemical treatment, e.g., chlorination is to be applied.

Another object of the present invention is to provide an arrangement of the foregoing character which may be economically fabricated and maintained in service.

A further object of the present invention is to provide an arrangement, as described which has a substantially long operating life.

SUMMARY OF THE INVENTION

The objects of the present invention are achieved by providing a conversion tank with an intake for the water to be treated and a drain for the treated water. There are hollow bodies which have several rotating perforations in the wall and are on one side completely emerged from the water and on the other side are completely immersed in the water. These bodies are particularly pipes and are filled with matter which is insoluble in water and has a large surface accessible to air and water.

The hollow bodies should preferably be pipes which are parallel to each other and parallel to the water surface and whose walls have a large number of perforations. The perforations are preferably slots, especially with parallel axes. The pipes are preferably placed on the periphery of driven wheels, preferably spoke wheels located in the conversion tank, with two such wheels preferably located on one shaft.

The rotating pipes on the emergent side, carry along a large quantity of water which runs back to the conversion tank through the perforations during the travel of the pipes above the water level, and are enriched with air. When the pipes after their travel above the water surface come again in contact with the water on the immersion side, virtually all the carried water has flown back. The pipes have filled with air to the extent possible. A large part of this air is dragged on the immersion side by the pipes underneath the water level, is forced by the water out of the pipes and rises in the water, leading to further aeration of the water. The biological breeding ground which forms on the material with the large surface accessible to water and air, whenever the water comes in contact with this culture medium, converts the harmful materials, particularly the fecal matter, into the harmless matter. The water leaving the conversion tank, preferably after separating solid and floating matter, can be used again, e.g., for water cattle and for hatching, breeding and feeding fish.

It is meaningful to place the perforations in the walls of the pipes in such a way that perforations are present only on the halfshell which is on top on the emergent side.

This construction appreciably increases the water quantity which is carried out by the pipes on the emergent side and which during the travel of the pipes above the water surface slowly runs back into the conversion tank and hence the water quantity which is intensively aerated in this manner. This water can, at the earliest, flow through the perforations when the pipe is vertically above the axis of rotation. On the immersion side, the air quantity dragged along by the pipes underneath the water level is considerably increased and, in addition, it is ensured that the last air can escape at the earliest from the a pipe when it is vertically below the axis of rotation. The quantity of air carried into the water is thus considerably increased and the time during which the air escapes from the pipes is lengthened considerably. With this arrangement of the pipes, the effectiveness of the culture medium is considerably improved.

After separating the floating and solid matter, the run-off water, after chlorination or other chemical treatment, may be used as potable water.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a vertical section taken along line A—A of FIG. 1 through the conversion at right angles to the axis of rotation of the pipes;

FIG. 3 is a vertical section taken along line B—B of FIG. 1 through the conversion tank parallel to the axis of rotation of the pipes;

FIG. 4 is a view taken along line C—C of FIG. 1 through the attached settling tank;

DESCRIPTION OF THE PREFERRED EMBODIMENTS

Figure 1:
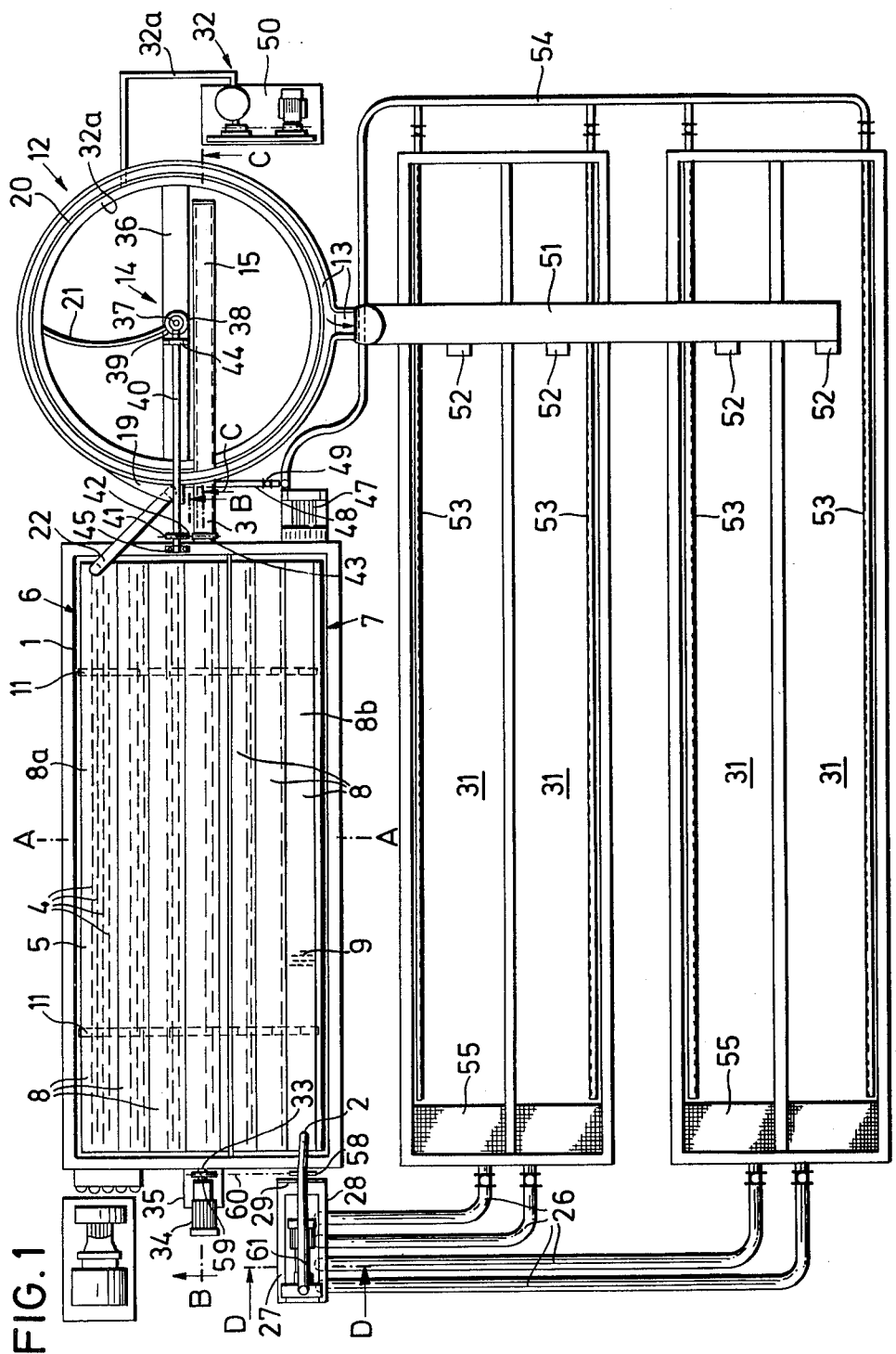
FIG. 1 is a top view of an installation in accordance with the present invention for the hatching, breeding and feeding of food fishes.
Figure 5:
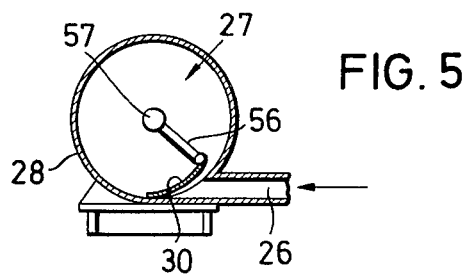
FIG. 5 is a section taken along line D—D of FIG. 1 through a collecting tank ahead of the conversion tank.

In FIGS. 1 through 8, the conversion tank 1 on one end has an intake 2 and on the other end a drain 3. The drain 3 is advantageously placed below water surface 10. The intake 2 may have any shape. In the embodiment shown, it is pipelike and located above the upper edge of the conversion tank 1 into the latter. It should terminate above the water surface 10. The descending water takes along air underneath the water surface, so that, in addition to the slight aeration of the descending water, a certain aeration through the carried air is achieved. In the conversion tank 1, underneath the water surface 10, at ⅔ the height of the tank, a shaft 33 is supported in the end walls, hence parallel to the lengthwise axis of the tank and parallel to the flow direction in a watertight and rotatable manner.

The stumps protrude on both ends to the outside from the end walls of conversion tank. One end preferably the end containing intake 2 holds drive 34 on a console 35. This drive is connected to shaft 33. The drive 34 is an electric motor. Of course, other types and arrangements are possible for drive 34, e.g., via pulleys and V-belts. In conversion tank 1, shaft 33 mounts two wheels 11, e.g., spoke wheels, rotating tracks, etc., at a suitable distance from each other and from the end walls of conversion tank 1. Along their periphery, these wheels carry a large number of pipes 8 whose length is only slightly shorter than the length of conversion tank 1. Wheels 11 and pipes 8 are designed so that during their rotation, the pipes extend almost to the bottom of the conversion tank 1 and during one rotation, are above the water surface 10 for only ⅓ of their travel. Only a small space is to remain between the individual pipes. The pipes 8 are parallel to each other, parallel to the water surface 10, and parallel to the direction of flow of the water in conversion tank 1. The direction of motion of the tubes is marked in FIG. 2 by an arrow. In half-shell 8a, which on the emergent side 6, hence during emergence of the pipes 8 from the water, is on top, the pipes 8 in walls 5 have a large number of perforations. On the other hand, the half-shell 8b, which is on top on the immersion side, has no perforations. The perforations 4 are slits parallel to the lengthwise axis of pipes 8. The pipes 8 are filled with a material 9 which is impervious to water and to harmful material in the water in particular fecal matter and which has a very large surface accessible to water and air.

The pipes emerging from the water surface 10 on the emergent side drag along a considerable water quantity because the half-shell 8b below has no perforations. During the travel above the water surface from the emergent side 6 to immersion side 7, the pipes 8 are tilted so that on the immersion side 7 the half-shell 8b, which on the emergent side 6 is below, is now above. During this tilt motion of pipes 8, the water, taken along by the lower half-shell 8b on the emergent side, slowly runs through the perforations 4 in the other half-shell 8a and flows back to the conversion tank 1. It is aerated intensively and upon entering the water surface 10, takes along air with the water.

At the earliest, when the particular pipe 8 is vertically above shaft 33, the remaining water can run out through the perforations 4 in the other half-shell 8a. On the immersion side 7, pipe 8 is filled with air. The half-shell 8b which has no perforations, is on top. During immersion of pipe 8 on the immersion side 7 in the water, pipe 8 drags along a considerable amount of air. During the tilting of the pipe on its path from the immersion side 7 to the emergent side 6, the air is slowly forced by the water through the perforations 4 in the half-shell 8a till, at the position of the particular pipe 8 vertically underneath the shaft 33, but not earlier, the air may escape. Hence the pipe arrangement in accordance with the present invention achieves a very intensive and thorough aeration of the water with the continuously rotating pipes 8 also continuously circulating the water in conversion tank 1. In a very short time, there forms on the material 9 with the large surface accessible to water and air, a biological breeding ground, even when the water is not injected. This biological breeding ground, besides the conversion already achieved by the thorough aeration, converts the harmful matter contained in the water, particularly fecal matter, into harmless matter. This conversion is very thorough because the water repeatedly comes in contact with the biological breeding ground and flows off again and is intensively aerated at the same time. The water, running off from conversion tank 1 through drain 3, can, without further treatment, be directly delivered to rivers. With highly contaminated water, or with large water quantities, it is possible to place several conversion tanks 1 one behind the other and to pass the water successively through them. It is also possible to provide only one tank and to dimension the pipes accordingly. The lengths of the pipes is limited when there is danger that the pipes, during their travel above the water surface, may bend and break. However, in such cases, it is very possible to increase the number of wheels 11, located on shaft 33 and to provide several pipes 8, one behind the other.

If the water from conversion tank 1 is to be used again, it is necessary and, if the water is channeled somewhere e.g. the rivers, meaningful to provide, behind the conversion tank 1 in the direction of flow, a settling tank 12. In this tank, suspended matter and solid matter remaining in the water from conversion tank 1, are settled. In this case, drain 3 is connected to this settling tank 12. It is advantageous to arrange the drain 3, which discharges slightly below water surface 10, from the conversion tank 1 as a pipe 15, which at ⅔ of the height passes all the way through the settling tank 12 and is closed at the end facing away from conversion tank 1. On the side facing conversion tank 1, pipe 15 is advantageously passed through the side wall 20 of settling tank 12.

Within settling tank 12, pipe 15 has a large number of perforations 16 through which the water is introduced into the settling tank 12 and is distributed depending on the arrangement of the perforations. It is meaningful to provide perforations 16 in the pipe 15 only in half-shell 15a which is directed downward. The water exiting through the perforations 16 is formed upward, facilitating the settling of the solid and suspended matter. The sludge settling on the bottom 17 of settling tank 12 is drawn off, e.g. by means of a suitably designed suction device. The water freed from solid and suspended matter in the settling tank 12 is removed at the top from the settling tank 12. The upper edge of settling tank 12 may be in the form of an overflow 13 from which the water is withdrawn. It is desirable to provide, in settling tank 12, a bottom clearing device 14. It was found advantageous to use a bottom clearing device 14 comprising a driven clearing vane 21 which extends from the center of settling tank 12 to wall 20 and is curved backward in the direction of the clearing action from the center toward side wall 20. In this case, settling tank 12 is round.

The clearing vane 21 is best driven by shaft 33 in conversion tank 1; the stub of this shaft projects from the end wall of conversion tank 1 on the side facing the settling tank 12. In this case, a console 36 is provided in the upper part of settling tank 12; this console holds the shaft 37, which mounts the clearing vane 21, in a vertical fashion. The bottom end of shaft 37 is mounted in the center of bottom 17 of settling tank 12. On its upper end, shaft 37 has a bevel gear 38 which meshes with a bevel gear 39 fastened to one end of a shaft 40 whose other end mounts a pulley 41 driven by a belt 42 which runs over this pulley 41 and pulley 43 on the stub of shaft 33. Shaft 40 is supported by a support 44, on the console 36 in settling tank 12, and by a support 45 on the end wall of conversion tank 1. With this arrangement for clearing device 14, the intake 3, 15 is displaced from the center and conducted to the settling tank 12. In order to withdraw the sludge, it is expedient to provide at the bottom inside wall 20, directly above bottom 17, an outward-directed bay as sludge catcher 19 into which the clearing vane 21 pushes the sludge which has been cleared from the bottom. It is desirable to arrange the bay in such a way that sludge catcher 19 reaches to the bottom of the settling tank. At the bottom of sludge catcher 19, is the closeable drain 18 through which the sludge present in the sludge catcher 19 can be drained at predetermined intervals. It is possible to provide between sludge drain 18 and conversion tank 1 a cross connection 22 through which the sludge settling in settling tank 12 is returned to the conversion tank in its entirety or partially. In this case, shut-off device 46 in drain 18 is a three-way valve which enables the closing of drain 18 or the draining off of the sludge through it or the passing of the sludge to cross connection 22.

It is advantageous to provide cross connection 22 with a conveying device 23 for conveying the sludge from settling tank 12 to conversion tank 1. As conveying device, it is convenient to use an air jet pump, preferably an air injector, which is located in a bent of the cross connection 22 in such a manner as to drive the sludge to conversion tank 1. This air jet pump 23 is driven by conveyor 47 via closeable conduit 48. The shut-off device in this conduit is designated by reference numeral 49. The cross connection 22 expediently discharges above water surface 10 in conversion tank 1. If the water withdrawn from settling tank 12 is to be used as drinking water, it is possible to provide a filter bottom 24 above the pipe 15 in settling tank 12 and a filter layer on top of it. The water is delivered to the settling tank underneath the perforated shelf 24 and drained above filter layer 25. Of course, it is possible to provide a separate filter tank in the settling tank instead of perforated shelf 24 and filter layer 25. At certain water temperatures the breeding conditions for fish are particularly ideal.

If the water drained from settling tank 12 is delivered to fish tank 31, it is advantageous to provide in the installation, in particular in the settling tank 12, a heat exchanger 32 by means of which the water flowing to fish tank 31 can be kept at the same temperature, and cooled or heated as required. In the embodiment shown, the heat exchanger 32 is a serpentine tubular heat exchanger whose tubes are located on the inside, away from the walls 20 of settling tank 12. Pipe 32a leads downward and passes slightly beyond clearing vane 21. The lower end of pipe 32a is bent upwards and, together with the upper end, leads to heat exchanger 50. In the embodiment shown, the water drained from settling tank 12 is delivered from overflow 13 to pipe 51 which is located above fish tank 31 and has a drain stub 52 for each fish tank. The stubs 52 should be shaped in such a way that from these stubs 52 the water flows freely into fish tanks 31, again to increase the aeration of the water. Pipe 51 should be located on one end above fish tanks 31. The water is drained from the fish tanks 31 at the opposite ends. Fish tanks 31 may have perforated pipes 53 at the bottom, preferably on a side wall, which pass through an end wall and are closeable and are connected to compressor 47 via a common connection 54. If the perforations are located at the side of the perforated pipes 53 in such a way that the exiting air flows extensively over the bottom of the fish tank, these pipes can be used to agitate settling sludge so that it is carried by the water in direction of the flow. At the end opposite intake pipe 51, the water is carried away through the conduits 26 from the fish tanks to conversion tank 1.

It is advantageous to provide in the fish tanks 31, a short distance ahead of the exit end, a filter 55 which extends throughout the height of the fish tanks. This prevents water from carrying off the fish. These feeders 26 should be closeable. In the embodiment shown, feeder 26 lead from the individual fish tanks 31 to a collecting tank 27. It is advantageous to design the collecting tank 27 in a cylindrical form and to have the feeders 26 discharge tangentially from the side through wall 28 into collecting tank 27. In collecting tank 27, there is a revolving lip 30 of elastic material which always makes contact with wall 28 in such a way that when traveling past the connections of feeder pipes 26, these connections are fully covered. This results in a suction effect in the feeder pipes and ensures that they are free of sludge deposits. Lip 30 is fastened to one end of rod 56 whose other end is fastened to shaft 57 located rotatably in collecting tank 27. On one end, preferably the end facing conversion tank 1, shaft 57 passes through end wall 29 in a water-tight fashion and mounts a pulley 58. Belt 60 passes over pulley 58, and pulley 59 on the drive shaft of shaft 33, which projects through the end wall of conversion tank 1 to the outside.

The transmission ratio between the shaft in conversion tank 1 and the shaft in collecting tank 27, and the transmission ratio between shaft 33 in conversion tank 1 and shaft 37 of clearing device 14, is such that the clearing vane 21 rotates very slowly and lip 30 rotates with a velocity which produces a sufficient suction effect in the feeder pipes 26. The water is drained from the collecting tank 27 by means of the intake 2, which passes through an end wall of collecting tank 27, to conversion tank 1. In the embodiment shown, the water is drained from the collector tank 27 through a pipe 61 which passes at the upper end facing away from the conversion tank 1 through side wall 28 of collecting tank 27 and is connected to intake 2. Collecting tank 27 may be attached to the end wall of conversion tank 1 on a console. Of course, other types of attachment and arrangement are possible.

Figure 6:
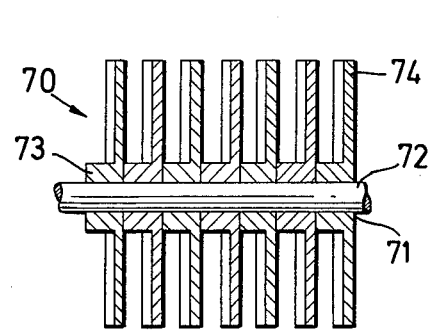
FIG. 6 is a section through objects strung along a shaft with a large area accessible to air and water.
Figure 7:
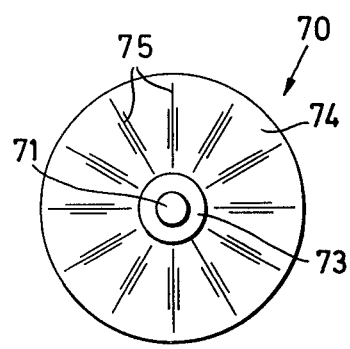
FIG. 7 is a top view of such an object.

Material 9 must have a large surface accessible to air and water and be resistant to water and harmful materials contained in the water, particularly fecal matter. Otherwise, it may have any design. Material 9, as shown in FIGS. 6 and 7, consists of disc-shaped bodies 70, whose diameter corresponds to or is slightly smaller than the inside diameter of pipes 8. These discs 70, which have holes 71 in their center, are arranged on a rod 72 whose length corresponds to the inside length of pipes 8 from end wall to end wall. Around the hole 71, these discs 70, at least on one side, have been made thicker so that the discs 70 can be slid under the rod, one by one, and at the same time, a sufficient space remains between the outer rims 74 of the discs into which space air and water can enter. In order to increase the surface area, the outer rims 74 of discs 70 should be undulated as much as possible, or perforated or burled, etc. In this embodiment, the discs are undulated and have undulated 75.

Figure 8:
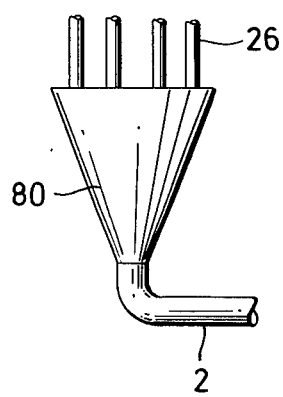
FIG. 8 is a funnel-shaped collecting tank.

As shown in FIG. 8, the collecting tank 80, between feeder pipes 26 and intake 2, for the conversion tank 1, may also be funnel-shaped. This funnel 80 should be designed in such a way that the water runs through the funnel 80 via feeder pipes 26 and via the intake 2, due to its gradient. Of course, it is possible to provide, in feeder pipes 26 and/or intake 2, pumps or similar conveyances.

If the water is delivered from sewage canals or the like, to conversion tank 1, it is advantageous to provide, ahead of the conversion tank 1, a coarse filtering device, e.g. a filter or a grill, if necessary, in conjunction with a wave trap, in order prevent coarse and/or heavy matter such as pieces of wood, rock, sand, etc., carried by the water, from entering the conversion tank.

Figure 9:
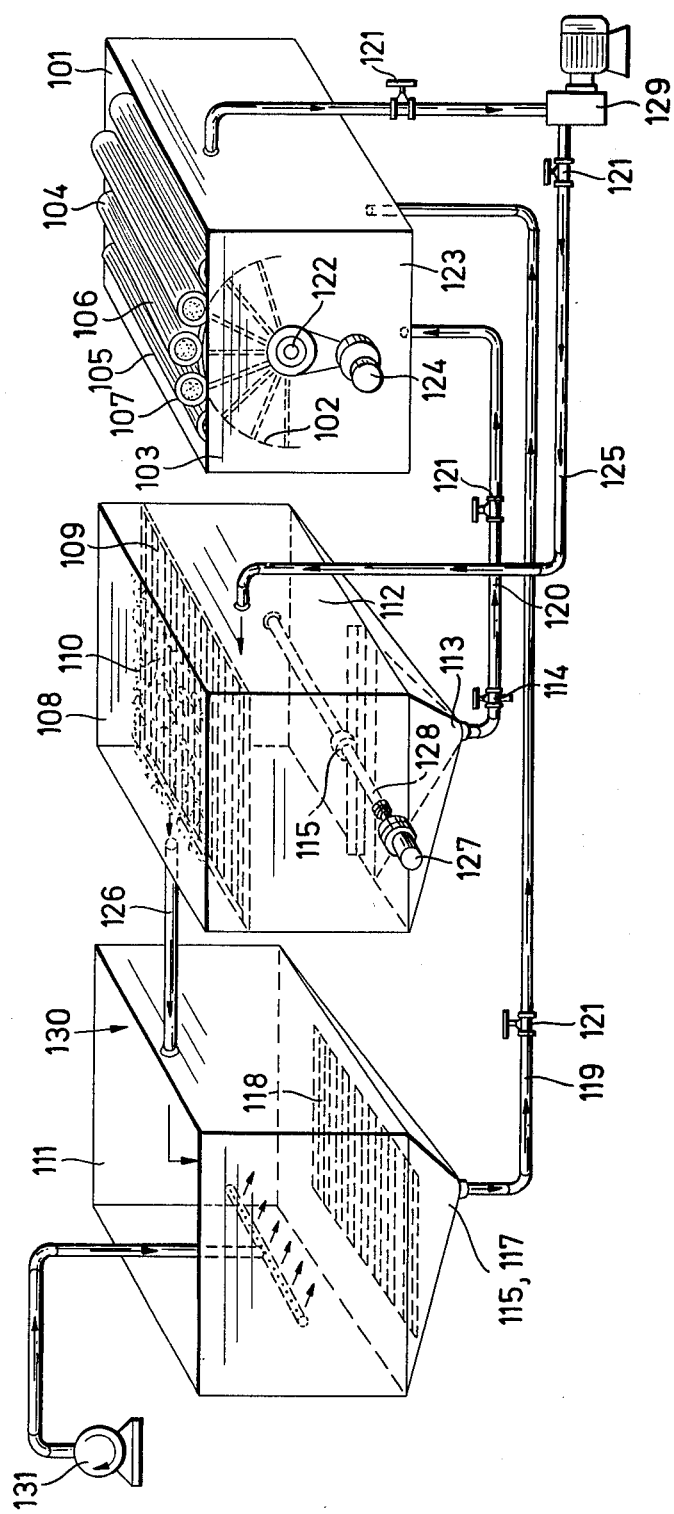
FIG. 9 shows an arrangement different from FIG. 1 for the hatching, breeding and feeding of food fishes.

In the installation, according to FIG. 9, there is provided on each end of tank 101, a spoke or spoked wheel 102, which are connected by a shaft 122. Shaft 122 is supported at both ends in the end wall 123 of tank 101. Element 124 is the drive for the spoke wheels 102. This drive is expediently fastened to the outside of an end wall 123. The free ends of spokes 102a of spoke wheels 102 are connected by pipes 104 which are arranged parallel to the shaft of spoke wheels 102 and to the water surface 103. Walls 106 of pipes 104 have a large number of perforations 105 which are expediently designed as slots 105 parallel to the water surface 103 and to the shaft of the spoke wheels. Pipes 104 are filled with the material 107 which has a large surface area accessible to air and water, e.g. with a fiber-like material of suitable stability, which is formed into replaceable cartridges. On this material 107, there forms the biological breeding ground which effects the conversion of the harmful materials from the fish tanks 111 into harmless materials. The water from fish tanks 111 is delivered to tank 101 through conduit 119. The water is expediently drained from tank 101 through pipe 125. If spoke wheels are set in motion by means of drive 124, pipes 104 are immersed in the water on one side of tank 101. The water penetrates through slots 105 into pipes 104 and comes into intimate contact with the biological breeding ground on material 107 so that a virtually complete conversion of the harmful materials into harmless materials is assured. On the other side of tank 101, pipes 104 are lifted out of the water. The water in pipes 104 runs back through slots 105. Now, the water thus treated flows through pipes 125 to fish tanks 111.

It is advantageous to provide between tank 101 and fish tank 111 a filter tank 108 into which the water flows through pipes 115. This filter tank 108 is expediently divided horizontally by means of a perforated shelf 109, which carries a filter layer 110, preferably of gravel. Pipes 125 are introduced into the filter tank underneath the filter layer. From filter tank 108, the filtered water flows above the filter layer 110 through overflow pipes 126 in the wall into the fish tanks 111. This ensures that the water in the filter tank is freed of sediment, suspended matter, etc., so that virtually pure water reaches the fish tank. Hence, with this arrangement, it is possible, without difficulty, to observe the fish for growth etc., especially for fish diseases in the fish tanks. The bottom 112 of fish tank 108, on both ends, has funnel-shaped depressions 113, into which the settling sludge is pushed by means of the clearing device 115 moving back and forth along bottom 112. This clearing device 115 should extend throughout the width of bottom 112. On the bottom, the funnel-shaped depressions 113 have a sludge drain 114 through which the sludge is drained.

Clearing device 115 is moved back and forth by means of a drive 127, which is fastened on the outside to a side wall via a spindle-shaft 128. Bottom 116 of fish tanks 111 is advantageously shaped as funnel 117 in which a screen plate 118 is placed. From the lowest point of funnel 117, connecting line 119 leads to tank 101. A pump 129 is located in this connecting line. There is provided a cross connection 120 which emanates from sludge drain 114 of filter tank 108 and discharges between fish tank 111 and tank 101 into connecting line 119 or directly into tank 101. Both crossconnection 120 and connection line 119 between fish tank 111 and the discharge of cross-connection 120 hold flow controllers 121 which make it possible to add a regulated quantity of sludge from filter tank 108 to the water to be delivered to tank 101. With the installation, in accordance with the present invention, water replenishment is required only to the extent that water is drained with the sludge through sludge drain 114 or is removed or evaporated when replacing the filter layer 110. Elements 131 are aeration devices for fish tank 111.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. An arrangement for the conversion of foreign matter found in water, particularly sewage water, into harmless materials comprising, in combination, a conversion tank having an intake for water to be treated and having a drain for treated water; rotatable hollow means in said tank and having perforations in walls of said hollow means and emerging on one side completely out of water, the other side of said rotatable hollow means being immersed entirely into the water, said rotatable hollow means being filled with materials insoluble in the water and having a large surface area accessible to air and water; means for rotating said rotatable hollow means; a plurality of feeders to said intake of said conversion tank; a common collecting tank, all said feeders discharging into said collecting tank, said intake discharging from said collecting tank; said collecting tank being substantially cylindrically-shaped; said feeders entering laterally the cylindrical wall of said collecting tank, the intake of said conversion tank discharging from a head end area of said collecting tank; an elastic lip rotatable inside said collecting tank and contacting the cylindrical wall of said collecting tank, said lip covering completely the individual feeders when traveling past said feeders.

2. The arrangement as defined in claim 1 including shaft means in said tank; at least one spoked wheel on said shaft means for carrying said hollow means.

3. The arrangement as defined in claim 1 wherein said hollow means comprise pipes located parallel to each other and substantially parallel to the water surface.

4. The arrangement as defined in claim 1 wherein said perforations comprise slots with substantially parallel axes.

5. An arrangement for the conversion of foreign matter found in water, particularly sewage water, into harmless materials comprising, in combination, a conversion tank having an intake for water to be treated and having a drain for treated water; rotatable hollow means in said tank and having perforations in walls of said hollow means and emerging on one side completely out of water, the other side of said rotatable hollow means being immersed entirely into the water, said rotatable hollow means being filled with materials insoluble in the water and having a large surface area accessible to air and water; a plurality of feeders to said intake of said conversion tank; a common collecting tank, all said feeders discharging into said collecting tank, said intake discharging from said collecting tank; said collecting tank being substantially cylindrically-shaped; said feeders entering laterally the cylindrical wall of said collecting tank, the intake of said conversion tank discharging from a head end area of said collecting tank; said collecting tank being funnel-shaped, said feeders discharging into said funnel-shaped collecting tank and said intake exiting from said funnel-shaped collecting tank.

6. The arrangement as defined in claim 5 including a perforated shelf dividing horizontally said settling tank, filter layer means on said shelf, the water from said conversion tank entering said settling tank underneath said filter layer and being drained above said filter layer.

7. An arrangement for the conversion of foreign matter found in water, particularly sewage water, into harmless materials comprising, in combination, a conversion tank having an intake for water to be treated and having a drain for treated water; rotatable hollow means in said tank and having perforations in walls of said hollow means and emerging on one side completely out of water, the other side of said rotatable hollow means being immersed entirely into the water, said rotatable hollow means being filled with materials insoluble in the water and having a large surface area accessible to air and water for forming a biological breeding ground on said surface, said materials being fixedly arranged in said hollow means; and means for rotating said rotatable hollow means, the walls of said hollow means having a substantially large number of perforations, said hollow means comprising pipes with half-shells, said perforations being located only on the half-shell which is on top and on the emergent side of the water.

8. The arrangement as defined in claim 7 wherein said material comprises a substantially large number of solids with a large surface area accessible to air and water, said solids being disc-shaped elements having spacers, the rims of said disc-shaped elements having a substantial roughness.

9. The arrangement as defined in claim 8 including supporting rod means for supporting said disc-shaped elements and for insertion into and removal from said hollow means as cartridges.

10. The arrangement as defined in claim 7 including a settling tank behind the conversion tank in the direction of flow; conduit means connecting said settling tank to said conversion tank; cross connection means between a drain on said settling tank and said conversion tank; conveyance means in said cross connection means for conveying sludge from said settling tank to said conversion tank; means for shutting off said cross connection means; means for shutting off the drain at the bottom of said settling tank; shutoff means in said drain and having one position for blocking sludge drainage from said settling tank and having another position for opening said cross connection means between said drain and said conversion tank, said shutoff means having a further position for opening the sludge drainage.

11. The arrangement as defined in claim 10 wherein the water from said conversion tank is delivered through said conduit means at half the conversion tank height to said settling tank, said settling tank having an overflow on its upper portion, the water flowing from said settling tank on its upper portion via said overflow; a pipe-shaped drain from said conversion tank, said settling tank having a pipe at half the height of said settling tank and passing through said settling tank to the opposite wall thereof, said pipe of said settling tank being closed at said opposite wall and having a substantially large number of perforations in a downward facing half-shell.

12. The arrangement as defined in claim 10 including bottom clearing means in said settling tank; a sludge catcher comprising a pocket in a side wall of said settling tank in proximity of the bottom of said settling tank, said pocket having a closeable drain, said clearing means having a clearing vane rotatable on the bottom of said settling tank and extending from the center of said settling tank to said side wall of said settling tank, said clearing vane being curved in the clearing direction rearward from the center of said side wall.

13. The arrangement as defined in claim 10 wherein said conveyance means comprises an air jet pump for conveying sludge from said settling tank to said conversion tank.

14. The arrangement as defined in claim 7 including a plurality of feeders to said intake of said conversion tank; a common collecting tank, all said feeders discharging into said collecting tank, said intake discharging from said collecting tank; said collecting tank being substantially cylindrically-shaped; said feeders entering laterally the cylindrical wall of said collecting tank, the intake of said conversion tank discharging from a head end area of said collecting tank, an elastic lip rotatable inside said collecting tank and contacting the cylindrical wall of said collecting tank, said lip covering completely the individual feeders when traveling past said feeders.

15. The arrangement as defined in claim 7 wherein said material insoluble in the water and having a large surface area accessible to air and water are at rest, the conversion of said foreign matter into harmless materials being free from added auxiliary foreign matter; said foreign matter being degraded biologically free of precipitation, said harmless material being free of added iron compounds.

16. The arrangement as defined in claim 7 including fish tank means for hatching, breeding, and feeding of food fishes, means for sucessively cycling water through said fish tank means and through said conversion tank and back to said fish tank means, means for delivering the water discharged from said settling tank to said fish tank means, and means for delivering the water discharged from said fish tank means to said conversion tank.

17. The arrangement as defined in claim 16 including a filter tank between said conversion tank and said fish tank means.

18. The arrangement as defined in claim 17 including a perforated shelf dividing horizontally said filter tank, a filter layer on said shelf, the water from said conversion tank entering said filter tank underneath said filter layer and being drained from said filter layer to said fish tank means.

19. The arrangement as defined in claim 18 including a sludge drain in said filter tank, said filter tank having a planar bottom with a funnel-shaped depression on at least one end of said planar bottom, said depression extending throughout the width of said planar bottom, said sludge drain being located at the lowest point of said depression.

20. The arrangement as defined in claim 19 including clearing means slidable back and forth on the bottom of said filter tank and extending throughout the width of said bottom of said filter tank, said clearing means pushing settled sludge into said funnel-shaped depression.

21. The arrangement as defined in claim 16 including a screen plate in said fish tank means, said fish tank means having a funnel-shaped portion holding said screen plate, the water to be purified being drained from said fish tank means underneath said screen plate.

22. The arrangement as defined in claim 16 including a sludge drain in said fish tank means; connecting line means between said fish tank means and said conversion tank; cross connection means for discharging from said sludge drain of said fish tank means into said connecting line means; flow rate regulating means in said cross connection means and in said connecting line means between said fish tank means and the discharge location of said cross connection means.

23. The arrangement as defined in claim 7 wherein said intake and said drain are placed on opposite ends of said conversion tank.

24. The arrangement as defined in claim 7 wherein said hollow means comprises pipes with longitudinal axes parallel to the direction of water flow.

25. An arrangement for the conversion of foreign matter found in water, particularly sewage water, into harmless materials comprising, in combination, a conversion tank having an intake for water to be treated and having a drain for treated water; rotatable hollow means in said tank and having perforations in walls of said hollow means and emerging on one side completely out of water, the other side of said rotatable hollow means being immersed entirely into the water, said rotatable hollow means being filled with materials insoluble in the water and having a large surface area accessible to air and water for forming a biological breeding ground on said surface; and means for rotating said rotatable hollow means, a settling tank behind the conversion tank in the direction of flow; and conduit means connecting said settling tank to said conversion tank; fish tank means for hatching, breeding, and feeding of food fishes, means for successively cycling water through said fish tank means and through said conversion tank and back to said fish tank means, means for delivering the water discharge from said settling tank to said fish tank means, and means for delivering the water discharged from said fish tank means to said conversion tank; a filter tank between said conversion tank and said fish tank means; a perforated shelf dividing horizontally said filter tank, a filter layer on said shelf, the water from said conversion tank entering said filter tank underneath said filter layer and being drained from said filter layer to said fish tank means; a sludge drain in said filter tank, said filter tank having a planar bottom with a funnel-shaped depression on at least one end of said planar bottom, said depression extending throughout the width of said planar bottom, said sludge drain being located at the lowest point of said depression; clearing means slidable back and forth on the bottom of said filter tank and extending throughout the width of said bottom of said filter tank, said clearing means pushing settled sludge into said funnel-shaped depression.

* * * * *